United States Patent [19]

Kamatani et al.

[11] 4,456,744

[45] Jun. 26, 1984

[54] COMPOSITION FOR PRODUCING POLYURETHANE RESIN AT AMBIENT TEMPERATURE

[75] Inventors: Yoshio Kamatani, Osaka; Michio Tanaka, Shizuoka; Kyuya Yamazaki; Kenichi Nishino, both of Osaka, all of Japan

[73] Assignee: Takeda Chemical Industries, Ltd., Osaka, Japan

[21] Appl. No.: 445,098

[22] Filed: Nov. 29, 1982

[30] Foreign Application Priority Data

Dec. 23, 1981 [JP] Japan ................................ 56-208434

[51] Int. Cl.$^3$ ............................................. C08G 18/78
[52] U.S. Cl. .......................................... 528/71; 528/73
[58] Field of Search .................................... 528/71, 73

[56] References Cited

U.S. PATENT DOCUMENTS 3,730,953  5/1973  Naito et al. ............................ 528/44

FOREIGN PATENT DOCUMENTS 1145952  3/1969  United Kingdom .

Primary Examiner—Maurice J. Welsh
Attorney, Agent, or Firm—Antonelli, Terry & Wands

[57] ABSTRACT

Disclosed is a composition for polyurethane resins which is ordinarily of two-package type and curable at ambient temperature and which comprises an isocyanate component having oxadiazinetrione ring as a curing agent and a polyol component, having in the molecule, at least one of a tertiary amino group, a quaternary ammonium group and a salt-formed carboxyl group as a main component. The composition has excellent curability and provides cured products excellent in adhesiveness and physical properties.

10 Claims, No Drawings

COMPOSITION FOR PRODUCING POLYURETHANE RESIN AT AMBIENT TEMPERATURE

This invention relates to a novel composition for polyurethane resins. More particularly, it relates to a composition for polyurethane resins which contains an isocyanate component having oxadiazinetrione ring and a polyol component having at least one of a tertiary amino group, a quaternary ammonium group and a salt-formed carboxyl group in the molecule.

Hitherto, polyurethane resins have been used as, for example, coatings, adhesives and elastomers for various substrates such as woods, metals, roofing tiles, concrete, plastics, rubbers, papers, floor covering materials, water proof materials, sealing materials, etc. because they are superior to other synthetic resins in chemical resistance, stain resistance, adhesiveness, gloss, wear resistance, physical properties, weathering resistance, etc.

The compositions for polyurethane resins are classified as one-package type and multi-package type such as two-package type. The two-package type compositions usually comprise a polyol component which is a main component and a polyfunctional polyisocyanate component which is a curing agent. As this curing agent, ordinarily used are derivatives such as polyisocyanates having urethane, urea or biuret bond obtained by reaction of a diisocyanate with a polyol, water, amine, etc. and polyisocyanates having isocyanurate ring obtained by trimerization of a diisocyanate in the presence of catalysts. However, considerably larger amount of the curing agent is needed, because isocyanate content of these derivatives is much lower than that of the starting diisocyanate. The curing agent is more expensive than main component and a curing agent capable of curing even in a small amount has been desired. Moreover, these derivatives are of high viscosity and sometimes are required to be diluted with solvents in their practical application. Such being the case, high solid content type or solventless type curing agents have been desired for saving resources and preventing environmental pollution. Furthermore, urethane composition curable at ambient temperature generally requires a long time for complete curing and is inferior in workability.

The inventors have found before that the reaction for producing allophanates from an oxadiazinetrione ring and hydroxyl-containing compound readily proceeds even at ambient temperature in the presence of a tertiary amine or a tertiary phosphine (Japanese Patent Application No. 103697/81). They have made intensive researches to apply this knowledge to curing of urethane resin compositions. As a result, it has been found that when an isocyanate component having oxadiazinetrione ring is reacted with a polyol component having in the molecule at least one of a tertiary amino group, a quaternary ammonium group and a salt-formed carboxyl group, the allophanate-forming reaction readily proceeds even without a catalyst such as tertiary amine and that the isocyanate component having oxadiazinetrione ring has the advantages that it may be used in smaller amount as a curing agent and it can be used as high solid content type or solventless type curing agent. Moreover, a composition comprising a curing agent mentioned above and a polyol component having at least one of a tertiary amino group, a quaternary ammonium group and a salt-formed carboxyl group in the molecule exhibits excellent curability, film and adhesive performance and physical properties after cured. Thus, this invention has been accomplished.

This invention relates to a composition for polyurethane resins which contains an isocyanate component having an oxadiazinetrione ring and a polyol component having in the molecule at least one of a tertiary amino group, a quaternary ammonium group and a salt-formed carboxyl group.

The isocyanate component having an oxadiazinetrione ring used in this invention means a compound having two reactive groups, i.e., an oxadiazinetrione ring and isocyanate group together in one molecule. Such compound can be prepared by known method, specifically, by the reaction of an isocyanate with carbon dioxide. The isocyanates include aliphatic, alicyclic and aromatic-aliphatic polyisocyanates, e.g., tetramethylene diisocyanate, hexamethylene diisocyanate, $\omega,\omega'$-diisocyanatodipropyl ether, 2,6-diisocyanatocaproic acid ester, 1,6,11-triisocyanatoundecane, bis-(isocyanatomethyl)cyclohexane, bis(isocyanatoethyl)-cyclohexane, 1-isocyanato-3-isocyanatomethyl-3,5,5-trimethylcyclohexane, bis-(4-isocyanatocyclohexyl)methane, xylylene diisocyanate, bis(2-isocyanatoethyl)benzene, etc. These polyisocyanates may be used alone or as a mixture thereof. Furthermore, these polyisocyanates may be used as mixtures with monoisocyanates such as methyl isocyanate, ethyl isocyanate, n-butyl isocyanate, $\omega$-chlorohexyl isocyanate, cyclohexyl isocyanate, cyclohexylmethyl isocyanate, benzyl isocyanate, phenylethyl isocyanate, etc.

The reaction of the isocyanate with carbon dioxide is carried out in the presence of a catalyst. As the catalyst, tertiary phosphines, arsenic compounds and hydroquinones may be used and the tertiary phosphines are especially effective. When an isocyanate having oxadiazinetrione ring has been obtained by the reaction of an isocyanate with carbon dioxide, the reaction product may be used, as it is, as the isocyanate component of this invention, but usually various compounds are preferably added thereto for termination of the reaction when predetermined reaction rate has been attained and for stable storage of the product. Such reaction terminators and stabilizers include alkylating agents, acylating agents, acids, ester derivatives, phenols, peroxides, sulfur, polysulfides, metal sulfides, halogens, etc. Especially, the isocyanate component having oxadiazinetrione ring to which an additive selected from peroxides, sulfur, polysulfides, metal sulfides and halogens is added is preferred because the reaction of the oxadiazinetrione ring and isocyanate with hydroxyl group of polyol component smoothly proceeds.

In the preparation of the isocyanate component having an oxadiazinetrione ring from polyisocyanate and carbon dioxide, adducts having terminal NCO group may also be used as the polyisocyanate. Such adducts can be obtained by reacting polyisocyanates with polyol compounds (e.g., ethylene glycol, propylene glycol, 1,4-butanediol, glycerine, trimethylolpropane, polyether polyol, polyester polyol, acrylic polyol, epoxy polyol, etc.) or polyamine compounds (e.g., ethylenediamine, hexamethylenediamine, phenylenediamine, polyether polyamine, polyamide polyamine, etc.) in an excess ratio of NCO group to active hydrogen of the polyol or polyamine compounds. Polyisocyanates, NCO of which is partially blocked with a blocking agent and those having partially dimerized or trimerized NCO groups may also be used as the polyisocyanates.

Futhermore, there may also be used as the isocyanate component adducts, blocked derivatives and polymerized derivatives of the isocyanate having an oxadiazinetrione ring obtained by reaction of polyisocyanate with carbon dioxide. The additon reaction, blocking reaction or polymerization reaction may be carried out simultaneously with the reaction of preparing the oxadiazinetrione ring. Furthermore, it is also possible to use mixtures of the isocyanates having oxadiazinetrione ring with said adducts, blocked derivatives or polymerized derivatives which have been respectively prepared.

Of the isocyanate components having an oxadiazinetrione ring enumerated above, those which are derived from hexamethylene diisocyanate, 1-isocyanato-3-isocyanatomethyl-3,5,5-trimethylcyclohexane or bis(isocyanatomethyl)cyclohexane provide compositions especially excellent in physical properties and curability.

The isocyanate component having an oxadiazinetrione ring employable in this invention is the one having an average functionality of preferably about 2 to 10 which is the sum of oxadiazinetrione ring and isocyanate group in one molecule. The functionality is optionally determined depending on functionality, OH value and molecular weight of the polyol component, molecular structure of curing agents and physical properties of cured resins.

When said isocyanate component contains unreacted isocyanate monomers, low functional substances, etc. and, therefore, is unsuitable to use as it is, it is also possible to remove the monomers, low functional substances, etc. by appropriate methods such as distillation, extraction, crystallization, etc. Thus obtained isocyanate component having oxadiazinetrione ring can be used as a curing agent as it is. Of course, if necessary, these isocyanate component may be used in such forms as suitable for use by diluting them with organic solvents, thinners, etc.

As the polyol component having in the molecule at least one of a tertiary amino group, a quaternary ammonium group and a salt-formed carboxyl group which can be used in this invention, mention may be made of a compound containing at least two hydroxyl groups and having a molecular weight of 100 to 100,000, preferably 100 to 50,000. More preferred is a polyol having 2 to 50 hydroxyl groups in the molecule and having a molecular weight of 100 to 30,000. In other words, there may be used polyester polyols, polyether polyols, polyether-ester polyols, polyester-amide polyols, acrylic polyols, polyurethane polyol, epoxy polyols, epoxy-modified polyols, oil-modified polyols, castor oil derivatives etc. which have been known as polyols for polyurethane and which have in the molecule at least one of a tertiary amino group, a quaternary ammonium group and a salt-formed carboxyl group. These polyols may further contain active hydrogen such as carboxyl, amino, thiol, etc.

The tertiary amino group, quaternary ammonium group or salt-formed carboxyl group may be introduced during or after preparation of polyols by known method.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyols obtained by ring opening polymerization of lactones such as caprolactone, methylcaprolactone, etc. with glycols, etc.

Examples of the polyether polyols are those which are obtained by addition of epoxide compounds such as ethylene oxide, propylene oxide, butylene oxide, tetrahydrofuran, styrene oxide, epichlorohydrin, phenylglycidyl ether, allylglycidyl ether, etc. alone or as a mixture or alternately to active hydrogen atom-containing initiators. As the active hydrogen atom-containing initiators, mention may be made of water, polyols such as ethylene glycol, propylene glycol, glycerol, trimethylolpropane, pentaerythritol, sorbitol, etc.

As examples of the polyether-ester polyols, mention may be made of those which are obtained by subjecting said polyether polyols and polybasic acids to esterification reaction and besides, those which have both the segments of polyether and polyester in one molecule and which are obtained by ring-opening copolymerization of epoxide compounds and acid anhydrides.

Examples of the polyester-amide polyols are those which are obtained by said polyesterification reaction where amino group-containing starting materials such as ethylenediamine, propylenediamine, hexamethylenediamine, xylylenediamine, hydrogenated xylylenediamine,ethanolamine, propanolamine, etc. are additionally used.

The acrylic polyols can be prepared by coplymerizing polymerizable monomers containing at least one hydroxyl group in one molecule with other monomers copolymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, hydroxyalkyl maleate and fumarates, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above and vinyl monomers such as styrene, α-methylstyrene, vinyl acetate, acrylonitrile, methacrylonitrile, etc.

As examples of polyurethane polyols, mention may be made of reaction products of polyols and polyisocyanates which have terminal hydroxyl group. Examples of the polyols are polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyols such as polyester polyol, polyether polyol, polyester ether polyol, polyester amide polyols, etc. As the polyisocyanates, mention may be made of polyisocyanates such as tetramethylene diisocyanate, hexamethylene diisocyanate, 2,6-diisocyanatomethylcaproate, 1-isocyanato-3-isocyanatomethyl-3,5,5-trimethylcyclohexane, 4,4′-methylenebis(cyclohexyl isocyanate), 1,3- or 1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of these polyisocyanates. Furthermore, reaction products of said polyisocyanates with said polyols a part of which is substituted with an amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyols.

Examples of the epoxypolyols are epoxy resins obtained by condensation reaction of a polyphenol compound or its ring hydrogenated product with epichlorohydrin. Besides these resins, epoxy ester resins obtained by reacting a fatty acid with an epoxy resin or modified epoxy resins obtained by reacting an alkanolamine with an epoxy resin may also be used.

The tertiary amino group may be introduced into said polyol component, for example, by addition reaction of an epoxy compound with a primary amine, secondary amine or hydroxy compound having amino group (e.g., butylamine, ethylenediamine, diethanolamine, N-methyldiethanolamine, etc.). Therefore, in the case of the polyether polyol and polyether-ester polyol, the tertiary amino group may be introduced by using a primary amine, secondary amine or hydroxy compound having amino group as a part or the whole of the reaction initiator. Furthermore, in the case of said polyester polyol, polyether-ester polyol, polyesteramide polyol, polyurethane polyol and epoxy polyol, the tertiary amino group may be introduced by using a hydroxy compound having tertiary amino group (e.g., N,N'-dimethylethanolamine, N-methyldiethanolamine, triethanolamine, etc.) as a part or the whole of the starting polyhydric alcohol, polyether polyol, amine, etc. In the case of the acrylic polyol, the tertiary amino group may be introduced by copolymerizing a vinyl monomer having tertiary amino group (e.g., dimethylaminopropyl acrylamide, morpholinoethyl methacrylate, 2-vinylpyridine, etc.) with other monomers. The tertiary amino group in these polyols may be present in the form of a salt with an acid component in the polyol or with other acid components.

The quaternary ammonium group includes a quaternary ammonium hydroxide group and a group in the form of its weak acid salt. The quaternary ammonium hydroxide group may be introduced into the polyols, for example, by reacting a tertiary amino group with a halogenated hydrocarbon (e.g., alkyl halides such as methyl chloride) by known method and treating the reaction product with silver oxide, alkali hydroxides, etc. A weak acid salt of quaternary ammonium (e.g., $CH_3COO^-$) may be introduced by treating said product with a weak acid. Furthermore, polyols having quaternary ammonium group may be obtained by using a hydroxy compound having quaternary ammonium group (e.g., choline salt, etc.) as a part of the starting materials used for production of said various polyols. The salt-formed carboxyl group means a carboxyl group which is in the form of a salt with alkali metals, alkaline earth metals or tertiary amino compounds. For example, they can be obtained by reacting, e.g., calcium oxide, potassium hydroxide, N-methyldiethanolamine, triethylamine, etc. with the above enumerated polyols having carboxyl group. Furthermore, a salt-formed carboxyl group can be introduced by using a carboxylic acid salt or a hydroxy compound having carboxylic acid salt (e.g., monosodium adipate, triethylammonium acrylate, potassium glycerate, etc.) in preparing the polyols.

Said polyol component may be used alone, but may also be used in combination with compounds having active hydrogen conventionally used for polyurethanes.

The amount of the tertiary amino group, the quaternary ammonium group and/or the salt-formed carboxyl group in the molecule of the polyol component is such that the proportion of nitrogen of the tertiary amino or quaternary ammonium group or that of carbonyloxy of the salt-formed carboxyl group to the whole composition is about 0.0001 to 10% by weight, especially about 0.0005 to 5% by weight.

The proportion of the isocyanate component having oxadiazinetrione ring to the polyol component is such that the sum of the number of isocyanate group and oxadiazinetrione ring to the number of hydroxyl group of the polyol component is generally in the range of 0.1 to 10, more preferably 0.5 to 3. When the composition is used as a coating material, the ratio is usually in the range of 0.4 to 2, preferably 0.6 to 1.4.

Said polyols having at least one of a tertiary amino group, a quaternary ammonium group and a salt-formed carboxyl group accelerate the reaction of the isocyanate component having oxadiazinetrione ring with hydroxyl group and give especially excellent curability at ambient temperature at which polyols having no said functional groups hardly cure. Further superior cured products are obtained by somewhat heating the composition. Furthermore, the cured products are also superior in weathering resistance, gloss, water resistance, solvent resistance and adhesiveness. In the composition of the present invention, the catalyst component for the allophanate-forming reaction is incorporated into the polyol component in place of separately adding a low-molecular weight catalyst. Therefore, the present invention has an advantage of giving a resin onto the surface of which the catalyst does not bleed out and this does not cause undesirable changes in surface properties of the resin and deterioration thereof. For the reaction of oxadiazinetrione ring, it is sufficient merely to use the polyols having a tertiary amino group, a quaternary ammonium group or a salt-formed carboxyl group, but for adjusting the reactivity of NCO group in the curing agent, it is effective to add known compounds for adjusting reaction rate of NCO group with OH group such as organic compounds, organic acid salts, or inorganic salts of tin, lead, nickel, zinc, titanium, antimony, iron, cobalt, bismuth, uranium, cadmium, aluminum, vanadium, mercury, potassium, sodium, zirconium and other metals and tertiary amines. Besides, if necessary, pigments, dyes, leveling agents, antifoamers, anti-sag agents, fillers, plasticizers, antioxidants, ultraviolet absorbers, etc. may be optionally used.

Thus obtained compositions of this invention are generally used as the so-called two-package type compositions which comprises isocyanate component having oxadiazinetrione ring for one package and polyol component for another. In the actual use of the composition, each component is mixed with each other as it is or in the form of solutions and the mixture is applied to the surface to be coated or adhered or injected into a mold, which cures at ambient temperature.

The composition of this invention is useful for coating and adhesion of woods, metals such as iron, aluminum, etc., plastics, rubber, papers, roofing tiles, concretes, etc. The composition of this invention may be used in a smaller amount of curing agents than the conventional urethane curing agents, i.e., about ⅓-¾ of the latter. Furthermore, since viscosity of the curing agent is low, the composition can be used as solventless type or high solid type coating materials, adhesives, elastomers, etc. Especially, when a polyol component having a molecular weight of not more than 10,000 is used as a main component, the composition is for solventless type coating materials, adhesives and elastomers. Moreover, although the pot life after mixing the components is relatively long, the mixture shows good curability. Especially when the mixture is heated (60° to 100° C. for 3 to 60 minutes), practically excellent cured products can be obtained. The obtained coatings have good appearance such as gloss, smoothness, etc. and excellent weathering resistance and elastomers are excellent in mechanical properties, weathering resistance, adhesiveness and wear resistance.

The following examples will further illustrate this invention.

REFERENCE EXAMPLE 1

To 841 g of hexamethylene diisocyanate was added 1.8 g of tri-n-butylphosphine while introducing carbon dioxide thereinto at 40° C. and the reaction was carried out for 6 hours with stirring. Feeding of carbon dioxide was discontinued and 0.3 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazinetrione content of 2.77 meq/g and a residual monomer content of 0.4%.

REFERENCE EXAMPLE 2

To 971 g of 1,3-bis(isocyanatomethyl)cyclohexane was added 3.0 g of tri-n-butylphosphine while introducing carbon dioxide thereinto at 10° C. and the reaction was carried out for 5 hours with stirring. Then, carbon dioxide was replaced with nitrogen and 3.8 g of benzoyl peroxide was added to the reaction product and the product was stirred for 30 minutes. Starting materials were removed from the product by evaporation with a film evaporator to obtain 280 g of viscous liquid of pale yellow. This product had an NCO content of 4.35 meq/g, an oxadiazinetrione content of 2.22 meq/g and a residual monomer content of 0.8%.

EXAMPLE 1

To 52.7 g of a polyester polyol (which was prepared from trimethylolpropane, phthalic anhydride and lauric acid, had an acid value of 4 mgKOH/g and an OH value of 140 and was as 75% butyl acetate solution) was added 3.5 ml of 1 N ethanolic potassium hydroxide, followed by stirring and mixing. Then, about 5 g of the solvent was distilled out under reduced pressure. To the product was added 40 g of 50% butyl acetate solution of the isocyanate component having oxadiazinetrione ring obtained in Reference Example 2 and then the mixture was diluted with a mixed solvent (1 : 1 : 1) of toluene, butyl acetate and 2-ethoxyethyl acetate. Thereto was added a toluene solution of 3 mg of dibutyltin dilaurate followed by mixing. Then, this solution was sprayed on a cold-rolled steel panel to form a coating of about 50μ thick. This panel was allowed to stand at room temperature for 7 days and properties of the coating are shown in Table 1. As a comparative example, properties of coating formed in the same manner as above except that no potassium hydroxide was added to said polyester polyol are also shown in Table 1.

TABLE 1

| Polyol component | KOH added | No KOH added |
|---|---|---|
| Pot life (Hr) | 15 | 48< |
| Dry hard time (Hr) | 6.2 | 8 |
| Pencil scratch test | 2H | H |
| Erichsen test (mm) | 3 | 2 |
| Cross hatch adhesion | 100/100 | 95/100 |
| Impact test (½ inch, g × cm) | 500 × 50 | 500 × 10 |
| Mandrel bending test (mm) | 5 | 10 |
| Solvent resistance (rubbing with ethyl acetate) | Good | Poor |

EXAMPLE 2

To each 100 g of acrylic polyol A (which was prepared from styrene, methyl methacrylate, hydroxyethyl acrylate, ethyl acrylate and butyl acrylate and had an average molecular weight of 14,000, an OH value of 40 and a non-volatile matter of 50%) and 100 g of acrylic polyol B (which was prepared from said monomer composition to which 1.0% of dimethylaminopropylacrylamide was added and had the same average molecular weight, OH value and nonvolatile matter as of the acrylic polyol A) were added 9.5 g of the isocyanate component having oxadiazinetrione ring obtained in Reference Example 1 and 2 mg of dibutyltin dilaurate. Then, each of the resultant solutions was diluted with a mixed solvent (1 : 1 : 1) of toluene, butyl acetate and 2-ethoxyethyl acetate. Each of the solutions was sprayed on a cold-rolled steel panel to form a coating of about 40μ thick. These panels were allowed to stand at room temperature for 7 days and properties of the coating are shown in Table 2.

TABLE 2

| Acrylic polyols | A | B |
|---|---|---|
| Pot life (Hr) | 28 | 6.5 |
| Dry hard time (Hr) | 6.5 | 2.3 |
| Pencil scratch test | HB - F | F |
| Erichsen test (mm) | 4 | 8 |
| Cross hatch adhesion | 90/100 | 100/100 |
| Impact test (½ inch, g × cm) | 500 × 30 | 1000 × 40 |
| Mandrel bending test (mm) | 5 | 2 |
| Solvent resistance (rubbing with ethyl acetate) | Poor | Good |

EXAMPLE 3

256 g of an epoxy resin (DER 732 of Dow Chemical Co.) and 93 g of aniline were mixed and reaction was carried out at 75° to 85° C. for 3 hours. To this reaction mixture was added 162.5 g of butylglycidyl ether and reaction was carried out at 100° to 110° C. for 7 hours to obtain a polyol having an OH value of 252 and a viscosity a 1510 cps at 25° C. 111 g of this polyol, 250 g of a polyether polyol having a molecular weight of 1500 obtained by addition of propylene oxide to glycerine and 132.5 g of the isocyanate component obtained in Reference Example 1 were mixed and the mixture was applied to a cold-rolled steel panel by a bar-coater to form a coating of about 50μ thick. This panel was allowed to stand at room temperature for 7 days and properties of the coating are shown in Table 3.

TABLE 3

| Dry hard time (Hr) | 5.5 |
|---|---|
| Pencil Scratch test | HB |

TABLE 3-continued

| | |
|---|---|
| Erichsen test (mm) | 8 |
| Cross hatch adhesion | 100/100 |
| Impact test (½ inch, g × cm) | 1000 × 50 |
| Mandrel bending test (mm) | 2 |
| Solvent resistance (rubbing with ethyl acetate) | Good |

EXAMPLE 4

To 100 g of polyoxypropylene glycol (molecular weight 2000) prepared by using N-methyldiethanolamine as an initiator was added 6.3 g of benzyl chloride and reaction was carried out at 70° C. for one hour. Then, to the product was added 48 ml of 1 N methanolic potassium hydroxide and the mixture was refluxed with heating. The product was cooled and the separated crystal was removed by filtration and the filtrate was concentrated under reduced pressure to remove methanol to obtain 110 g of a polyol. Separately, 19.4 g of 1,3-bis(isocyanatomethyl)cyclohexane, 100 g of polyoxypropylene glycol (molecular weight 1000) and 13.4 g of dipropylene glycol were reacted to 80° C. for 5 hours to obtain a polyurethane polyol, to which 30 g of the polyol obtained above was added, followed by mixing at 60° C. With the resultant product was mixed 35.0 g of the isocyanate component having oxadiazinetrione ring obtained in Reference Example 2 at 60° C. to obtain an adhesive composition. This composition had a viscosity of 4,500 cps at 60° C. Immediately, at 60° C., this composition was coated to a polyester film (PET, 12μ thick) at an amount of 1.5 g/m² and an aluminum foil (Al, 9μ thick) was laminated thereon by a solventless type laminator. Then, 1.5 g/cm² of the composition was applied to the aluminum surface. And, a cast polypropylene film (CPP, 60μ thick, the surface was subjected to corona discharge treatment) was laminated thereon to form three layers, which were cured at 40° C. for 3 days. Adhesive strength between Al/CPP was measured to indicate 850 g/15 mm (pulling rate 300 mm/min, T-peel). A bag was made from this laminate film, the inner side of which was the propylene film and meat sauce (manufactured by Nisshin Flour Milling Co., Ltd.) was packed in this bag. This sample was sterilized with hot water at 120° C. for 30 minutes under a pressure of 2 Kg/cm² and thereafter the state of adhesion and adhesive strength between Al/CPP were examined.

| | |
|---|---|
| Adhesive strength (g/15 mm) | 700 |
| State of adhesion | No change |

EXAMPLE 5

72.5 g of castor oil having an OH value of 161 and 4.8 g of tetraol having tertiary amino group in the molecule (OH value 550) which was an adduct of ethylene oxide to ethylenediamine were homogeneously mixed. To the mixture was added 37.5 g of the polyisocyanate component of Reference Example 1 followed by mixing. The mixture cured at room temperature after elapse of 24 hours to give an urethane elastomer foam having a specific gravity of 0.65.

We claim:

1. A composition for polyurethane resins which comprises an isocyanate component having an oxadiazinetrione ring and a polyol component having, in the molecule, at least one group selected from the group consisting of a tertiary amino group, a quaternary ammonium group and a salt-formed carboxyl group.

2. A composition for polyurethane resins according to claim 1, wherein the isocyanate component having an oxadiazinetrione ring is the one prepared by the reaction of an isocyanate compound with carbon dioxide.

3. A composition for polyurethane resins according to claim 2, wherein the isocyanate compound is an aliphatic, alicyclic or aromatic-aliphatic polyisocyanate.

4. A composition for polyurethane resins according to claim 3, wherein the polyisocyanate is hexamethylene diisocyanate, 1-isocyanato-3-isocyanatomethyl-3,5,5-trimethylcyclohexane or bis(isocyanatomethyl)cyclohexane.

5. A composition for polyurethane resins according to claim 1, wherein the polyol component is a compound containing at least two hydroxyl groups and having a molecular weight of 100 to 100,000.

6. A composition for polyurethane resins according to claim 5, wherein the compound is a polyol containing 2 to 50 hydroxyl groups in one molecule and having a molecular weight of 100 to 30,000.

7. A composition for polyurethane resins according to claim 6, wherein the polyol is polyester polyol, polyether polyol, polyether-ester polyol, polyester-amide polyol, acrylic polyol, polyurethane polyol, epoxypolyol, epoxy-modified polyol, oil-modified polyol, or caster oil which has, in the molecule, at least one group selected from the group consisting of a tertiary amino group, a quaternary ammonium group and a salt-formed carboxyl group.

8. A composition for polyurethane resins according to claim 1, wherein the amount of the at least one group selected from the group consisting of a tertiary amino group, a quarternary ammonium group and a salt-formed carboxyl group in the molecule of the polyol component is such that the proportion of nitrogen of the tertiary amino group or quaternary ammonium group or that of the carbonyloxy of the salt-formed carboxyl group to the whole composition is about 0.0001 to 10% by weight.

9. A composition for polyurethane resins according to claim 1, wherein the proportion of the isocyanate component having oxadiazinetrione ring to the polyol component is such that the ratio of the total number of isocyanate group and oxadiazinetrione ring to the number of hydroxyl group of the polyol component is in the range of 0.1 to 10.

10. A composition for polyurethane resins according to claim 1, which is a two-package type composition comprising one package for the isocyanate component and another package for the polyol component.

* * * * *